United States Patent [19]
Shioya

[11] Patent Number: 5,934,778
[45] Date of Patent: Aug. 10, 1999

[54] OPTICAL SYSTEM FOR LIQUID CRYSTAL PROJECTOR

[75] Inventor: Yukinori Shioya, Tokyo, Japan

[73] Assignee: NEC Corporation, Japan

[21] Appl. No.: 09/124,411

[22] Filed: Jul. 29, 1998

[51] Int. Cl.[6] .................................................... G03B 21/14
[52] U.S. Cl. ................................... 353/31; 353/84; 349/8
[58] Field of Search .................................... 353/31, 33, 34, 353/37, 84; 349/5, 8, 106

[56] References Cited

U.S. PATENT DOCUMENTS

| | | | |
|---|---|---|---|
| 5,135,300 | 8/1992 | Toide et al. | 353/33 |
| 5,605,390 | 2/1997 | Brice et al. | 353/34 |
| 5,743,610 | 4/1998 | Yajima et al. | 353/31 |
| 5,743,611 | 4/1998 | Yamaguchi et al. | 353/31 |

FOREIGN PATENT DOCUMENTS

| | | | |
|---|---|---|---|
| 3-103842 | 4/1991 | Japan | 353/84 |
| 659235 | 3/1994 | Japan . | |
| 743658 | 2/1995 | Japan . | |
| 792444 | 4/1995 | Japan . | |

*Primary Examiner*—William C. Dowling
*Attorney, Agent, or Firm*—Ostrolenk, Faber, Gerb & Soffen, LLP

[57] ABSTRACT

An optical system for a liquid crystal projector in which the deterioration of the contrast of a projection screen is prevented. The optical system, comprising: a light source 1 for emitting a white light, an optical divider 4, 5 for dividing said white light into red, green and blue lights, a liquid crystal display panel 17, 18, 19 for modulating each of said red, green and blue light, a polarizer 14, 15, 16 for polarizing each of said modulated red, green and blue light, an optical synthesis element 21 for synthesizing each of said polarized red, green and blue light, and a green-light removing element 23, 24, 25 for removing green light disposed between said liquid crystal display panel for said blue light and said color synthesis element. The green-light removing element 23, 24, 25 removes is provided between the blue-light modulating LCD panel 19 and the color synthesis element 21. Therefore the deterioration of the contrast of the blue-light modulating LCD panel 19 can be prevented.

7 Claims, 5 Drawing Sheets

OPTICAL SYSTEM FOR LIQUID CRYSTAL PROJECTOR

BACKGROUND OF THE INVENTION

1. Field of the Invention

The present invention relates to an optical system for a liquid crystal projector and more particularly, for a liquid crystal projector having three liquid crystal display panels corresponding to the three primary colors.

2. Description of Related Art

A liquid crystal projector is an appratus for projecting a color optical image corresponding to a provided image information signal onto a screen. The liquid crystal projector has an optical system therein for forming the color optical image.

In FIG. 3, an optical system of a liquid crystal projector is comprised of a light source 101, a curved reflecting mirror 102, a UV/IR (ultraviolet rays/infrared rays) cut filter 103, a red-light-reflecting color separation dichroic mirror 104, a green-light-reflecting color separation dichroic mirror 105, reflecting mirrors 106, 107 and 108, relay lenses 109 and 110, condenser lenses 111, 112 and 113, polarizers 114, 115 and 116, a red-light modulating LCD (liquid crystal display) panel 117, a green-light modulating LCD panel 118, a blue-light modulating LCD panel 119, a red filter 120, a cross dichroic prism 121 and a projection lens 122.

A white beam emitted from the light source 101 is reflected by the curved reflecting mirror 102, and travels as a substantially parallel beam. This parallel beam is separated into red, green and blue light by the red-reflecting color separation dichroic mirror 104 and the green-reflecting color separation dichroic mirror 105.

The red light comes into the red-light modulating LCD panel 117 through the reflecting mirror 106, the condenser lens 111, and the polarizer 114.

The green light comes into the green-light modulating LCD panel 118 through the condenser lens 112 and the polarizer 115.

The blue light comes into the blue-light modulating LCD panel 119 through the relay lens 109, the reflecting mirror 107, the relay lens 110, the reflecting mirror 108, the condenser lens 113, and the polarizer 116.

The red-light modulating LCD panel 117 optically modulates the incident red light and generates as an outgoing red optical image corresponding to the red component image information signal.

The green-light modulating LCD panel 118 optically modulates the incident green light and generates an outgoing green optical image corresponding to the green component image information signal.

The blue-light modulating LCD panel 119 optically modulates the incident blue light and generates an outgoing blue optical image corresponding to the blue component image information signal.

These optical images from each LCD panel 117, 118 and 119 are synthesized in cross dichroic prism 121 and comes into the projection lens 122.

The projection lens 122 enlarges the synthesized images and projects them onto a screen.

However, the light emitted from the green-light modulating LCD panel 118 has a certain spread as shown in FIG. 4, and the cross dichroic prism 121 shows incident angle dependency as shown in FIG. 5, such that the light having a large incident angle shifts to shorter wavelengths, while the light having a small incident angle shifts to longer wavelengths, so that the light having a large incident angle to a red reflecting plane is reflected by a red reflecting plane. The green light emitted from the green-light modulating LCD panel 118 is reflected by a red reflecting plane of the cross dichroic prism 121, and goes to the back surface of the blue-light modulating LCD panel 119. Therefore the contrast of the blue-light modulating LCD panel 119 is deteriorated.

Moreover if an absorption type blue-light penetration filter is disposed to prevent the green light from coming into the back surface of the blue-light modulating LCD panel 119, the white balance is deteriorated because only the absorption type blue-light penetration filter with a low penetration is available at present.

Furthermore, if only an reflection type blue-light penetration filter is disposed to prevent the green light from coming into the back surface of the blue-light modulating LCD panel 119, the green light reflected by the reflection type blue-light penetration filter is reflected by the red reflecting plane of the cross dichroic prism 121 and goes to the back surface of the green-light modulating LCD panel 118. Therefore the contrast of the green-light modulating LCD panel 118 is deteriorated.

SUMMARY OF THE INVENTION

An object of the present invention is to provide an optical system for a liquid crystal projector which can display a color image with high contrast project.

Another object of the present invention is to provide an optical system for a liquid crystal projector which can display a color image with an excellent white balance without the intensity loss of blue light.

To realize the above objects, the optical system as defined in claim 1 is comprised of: a light source for emitting a white light, an optical divider for dividing the white light into red, green and blue lights, a polarizer for polarizing each of the red, green and blue light, a liquid crystal display panel for modulating each of the polarized red, green and blue light, an optical synthesis element in which two color synthesis planes are arranged at right angle for synthesizing the polarized red, green and blue lights, and a green-light removing element for removing green light disposed between the liquid crystal display panel for the blue light and the color synthesis element.

The optical system as defined in claim 2, the green-light removing element is comprised of a reflection type blue-light penetration filter disposed between the blue-light modulating LCD panel and the color synthesis element, and a quarter-wave-length plate disposed between the color synthesis element and the reflection type blue-light penetration filter, and the lag-phase axis direction of the quarter-wave-length plate differs from the polarizing direction of outgoing light from the blue-light modulating LCD panel.

The optical system as defined in claim 3, the quarter-wave-length plate is arranged so that the lag-phase axis direction thereof is inclined 45 degrees with respect to the polarizing direction of outgoing light from the blue-light modulating LCD panel.

The optical system as defined in claim 4, the green-light removing element is comprised of a reflection type blue-light penetration filter disposed between the blue-light modulating LCD panel and the color synthesis element, and a quarter-wave-length plate disposed between the blue-light modulating LCD panel and the reflection type blue-light penetration filter, and the lag-phase axis direction of the quarter-wave-length plate differs from the polarizing direction of outgoing light from the blue-light modulating LCD panel.

The optical system as defined in claim 5, the quarter-wave-length plate is arranged so that the lag-phase axis direction thereof is inclined 45 degrees with respect to the polarizing direction of outgoing light from the blue-light modulating LCD panel.

The optical system as defined in claim 6, the green-light removing element is comprised of a reflection type blue-light penetration filter disposed between the blue-light modulating LCD panel and the color synthesis element.

Therefore a first quarter-wave-length plate disposed between the color synthesis element and the reflection type blue-light penetration filter. A second quarter-wave-length plate disposed between the blue-light modulating LCD panel and the reflection type blue-light penetration filter. The lag-phase axis directions of the first quarter-wave-length plate and the second quarter-wave-length plate differ from each other, and also differ from the polarizing direction of outgoing light from the blue-light modulating LCD panel.

The optical system as defined in claim 7, the first quarter-wave-length plate is arranged so that the lag-phase axis direction thereof is inclined 45 degrees with respect to the polarizing direction of outgoing light from the blue-light modulating LCD panel. The first quarter-wave-length plate and the second quarter-wave-length plate are arranged so that the lag-phase axes thereof intersect at right angle.

According to the optical system as defined in claim 1, the green-light removing element is provided between the blue-light modulating LCD panel and the color synthesis element. Therefore the deterioration of the contrast of the blue-light modulating LCD panel can be prevented.

According to the optical system as defined in claims 2 to 7, the reflection type blue-light penetration filter with a high penetration of the blue light is provided as the green-light removing element. Therefore the intensity loss of the blue light and the change of white balance can be reduced.

According to the optical system as defined in claims 2, 3, 6 and 7, the second quarter-wave-length plate is disposed on the outgoing side of the reflection type blue-light penetration filter. Therefore the polarizing direction of green light reflected by the reflection type blue-light penetration filter is turned, and the green light is easily absorbed by a polarizer on the outgoing side of the green-light modulating LCD panel, so that the decrease of the contrast of the LCD panel for green light can be prevented even if the reflection type blue-light penetration filter is used.

DETAILED DESCRIPTION OF THE PREFERRED EMBODIMENTS

Figure 1:
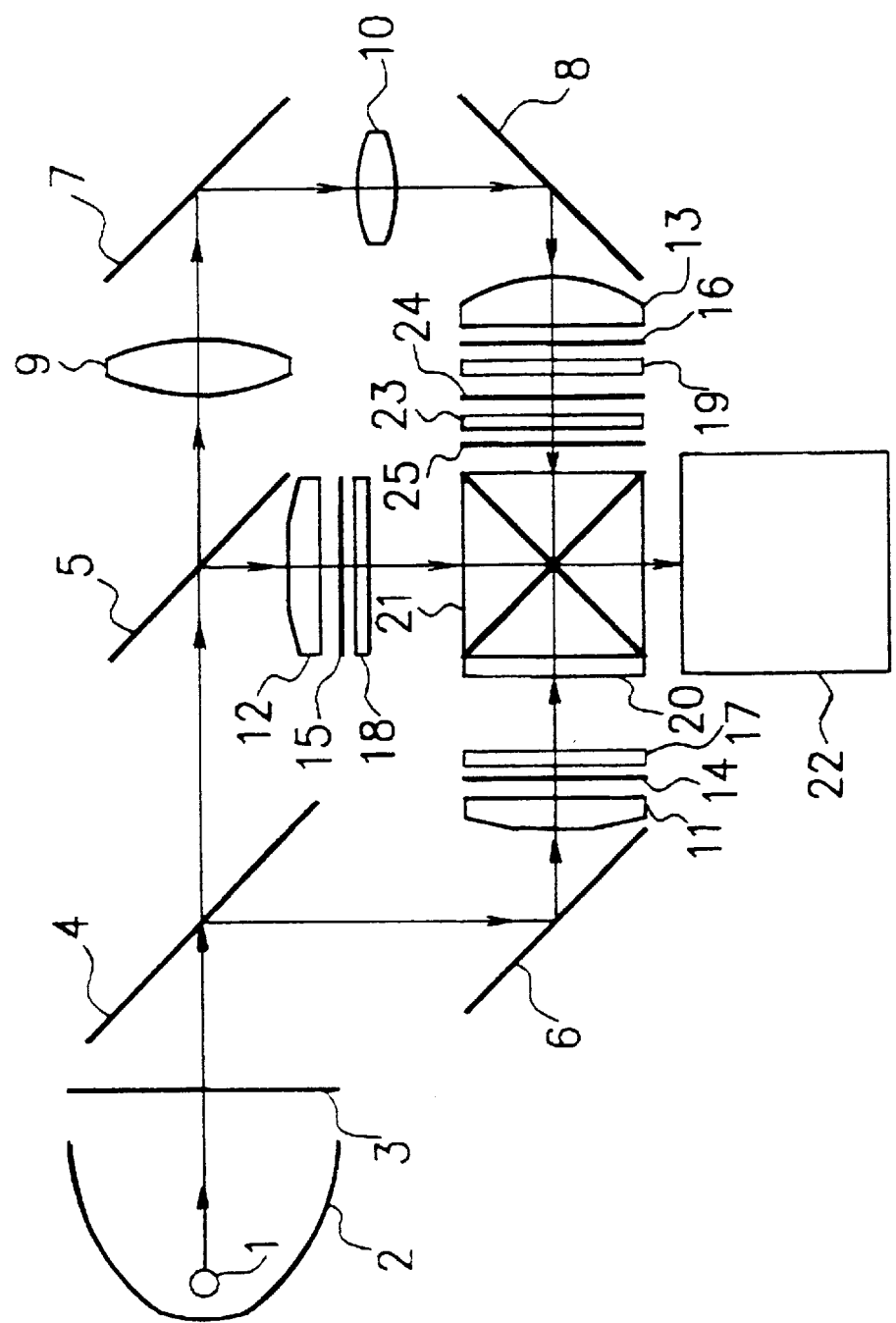
FIG. 1 is a schematic plan view showing an optical system of a liquid crystal projector according to the embodiment of the present invention.

In FIG. 1, an optical system for a liquid crystal projector according to the embodiment of the present invention is comprised of a light source 1, a curved reflecting mirror 2, a UV/IR (ultra violet rays/infrared rays) cut filter 3, a red-reflecting color separation dichroic mirror 4, a green-reflecting color separation dichroic mirror 5, reflecting mirrors 6, 7 and 8, relay lenses 9 and 10, condenser lenses 11, 12 and 13, polarizers 14, 15 and 16, an LCD (liquid crystal display) panel 17, an green-light modulating LCD panel 18, an blue-light modulating LCD panel 19, a red filter 20, a cross dichroic prism 21, a projection lens 22, a reflection type blue-light penetration filter 23, a first quarter-wave-length plate 24 on the incident side of the reflected type blue-light penetration filter 23 and a second quarter-wave-length plate 25 on the outgoing side of the reflected type blue-light penetration filter 23.

A white beam emitted from the light source 1 is reflected by the curved reflecting mirror 2, and travels as a substantially parallel beam. This parallel beam is separated into red, green and blue light by the red-reflecting color separation dichroic mirror 4 and the green-reflecting color separation dichroic mirror 5.

The red light comes into the red-light modulating LCD panel 17 through the reflecting mirror 6, the condenser lens 11, and the polarizer 14.

The green light comes into the green-light modulating LCD panel 18 through the condenser lens 12 and the polarizer 15.

The blue light comes into the blue-light modulating LCD panel 19 through the relay lens 9, the reflecting mirror 7, the relay lens 10, the reflecting mirror 8, the condenser lens 13, and the polarizer 16.

The red-light modulating LCD panel 17 optically modulates the incident red light and generates an outgoing red optical image corresponding to the red component image information signal.

The green-light modulating LCD panel 18 optically modulates the incident green light and generates an outgoing green optical image corresponding to the green component image information signal.

The blue-light modulating LCD panel 19 optically modulates the incident blue light and generates an outgoing blue optical image corresponding to the blue component image information signal.

These optical images from each LCD panel 17, 18 and 19 are synthesized in cross dichroic prism 21 and comes into the projection lens 22.

The projection lens 22 enlarges the synthesized images and projects them onto a screen.

The reflection type blue-light penetration filter 23 is disposed between the blue-light modulating LCD panel 19 and the cross dichroic prism 21.

The first quarter-wave-length plate 24 is disposed between the blue-light modulating LCD panel 19 and the reflection type blue-light penetration filter 23, namely placed on the incident side of the reflection type blue-light penetration filter 23.

The second quarter-wave-length plate 25 is disposed between the reflection type blue-light penetration filter 23 and the cross dichroic prism 21, namely placed on the outgoing side of the reflection type blue-light penetration filter 23.

Figure 2:
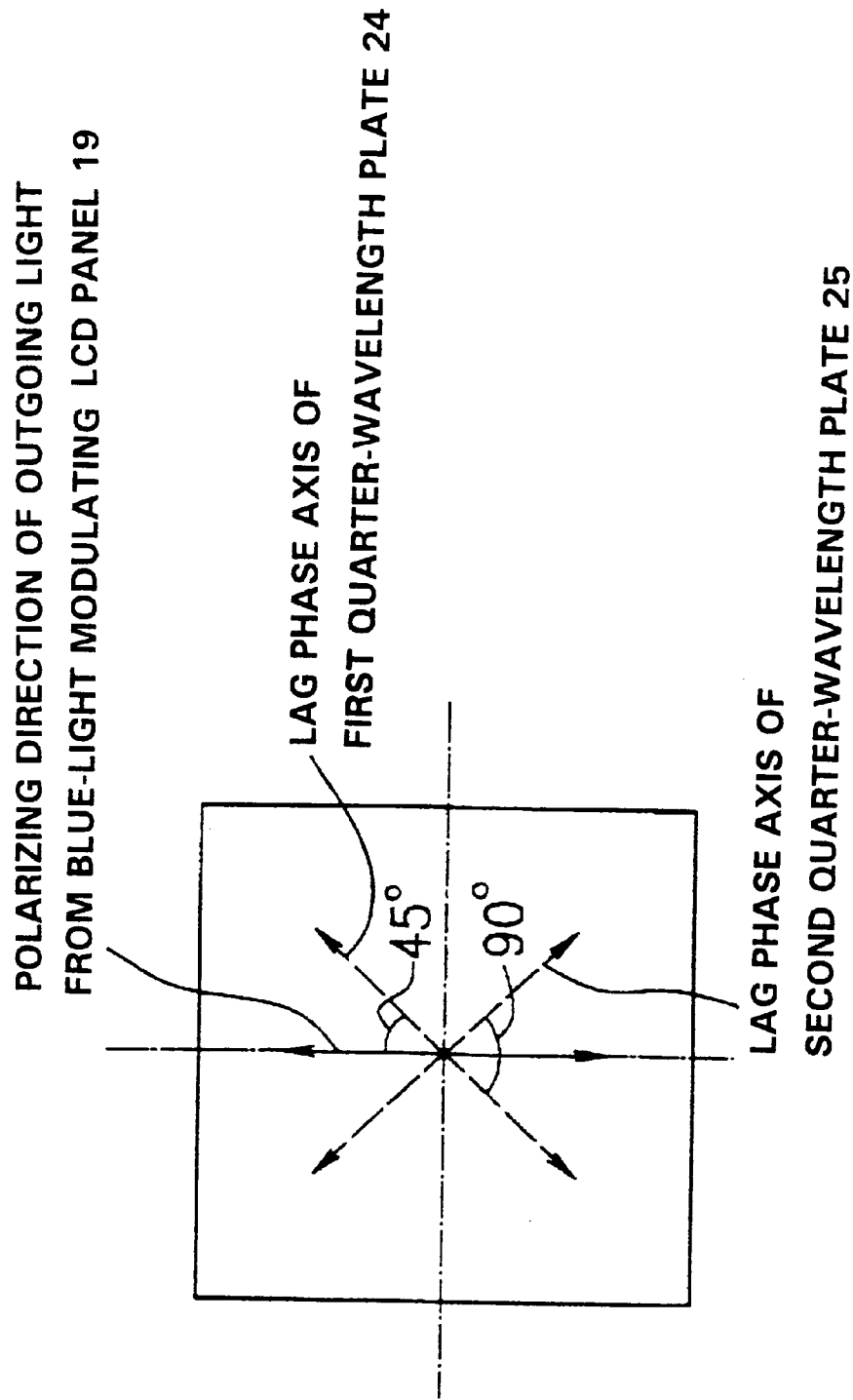
FIG. 2 is an explanatory diagram showing the lag-phase axis directions of the first and second quarter-wave-length plates according to the FIG. 1 embodiment.
Figure 3:
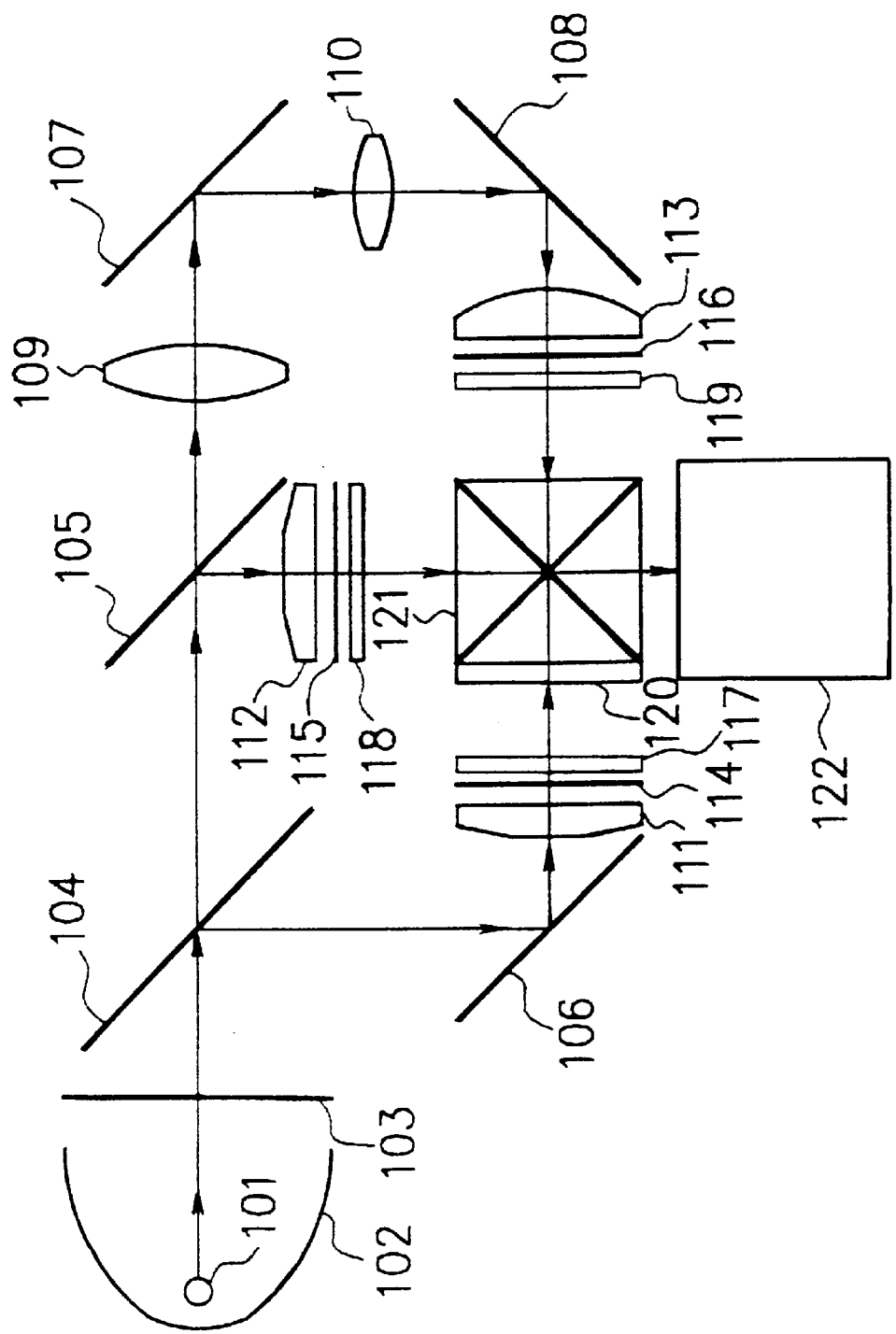
FIG. 3 is a schematic plan view showing an optical system of a liquid crystal projector according to the related art.
Figure 4:
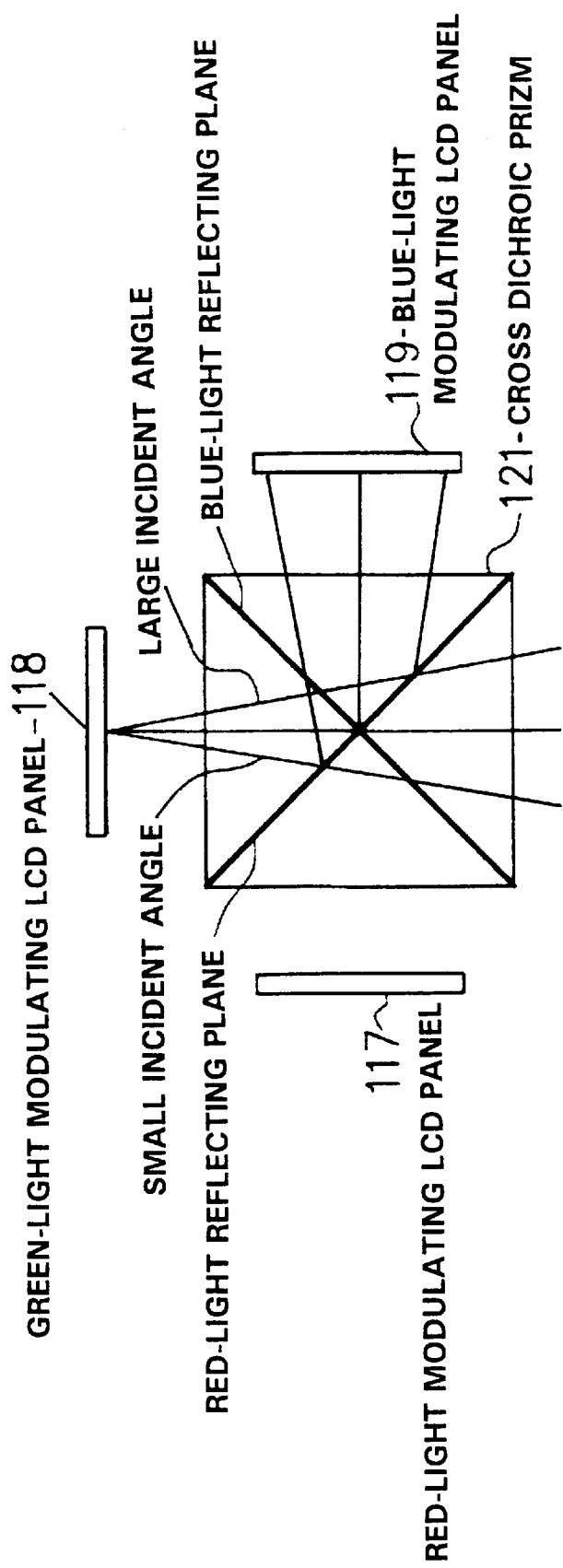
FIG. 4 is an explanatory diagram showing the incident angle of the cross dichroic prism according to the related art.
Figure 5:
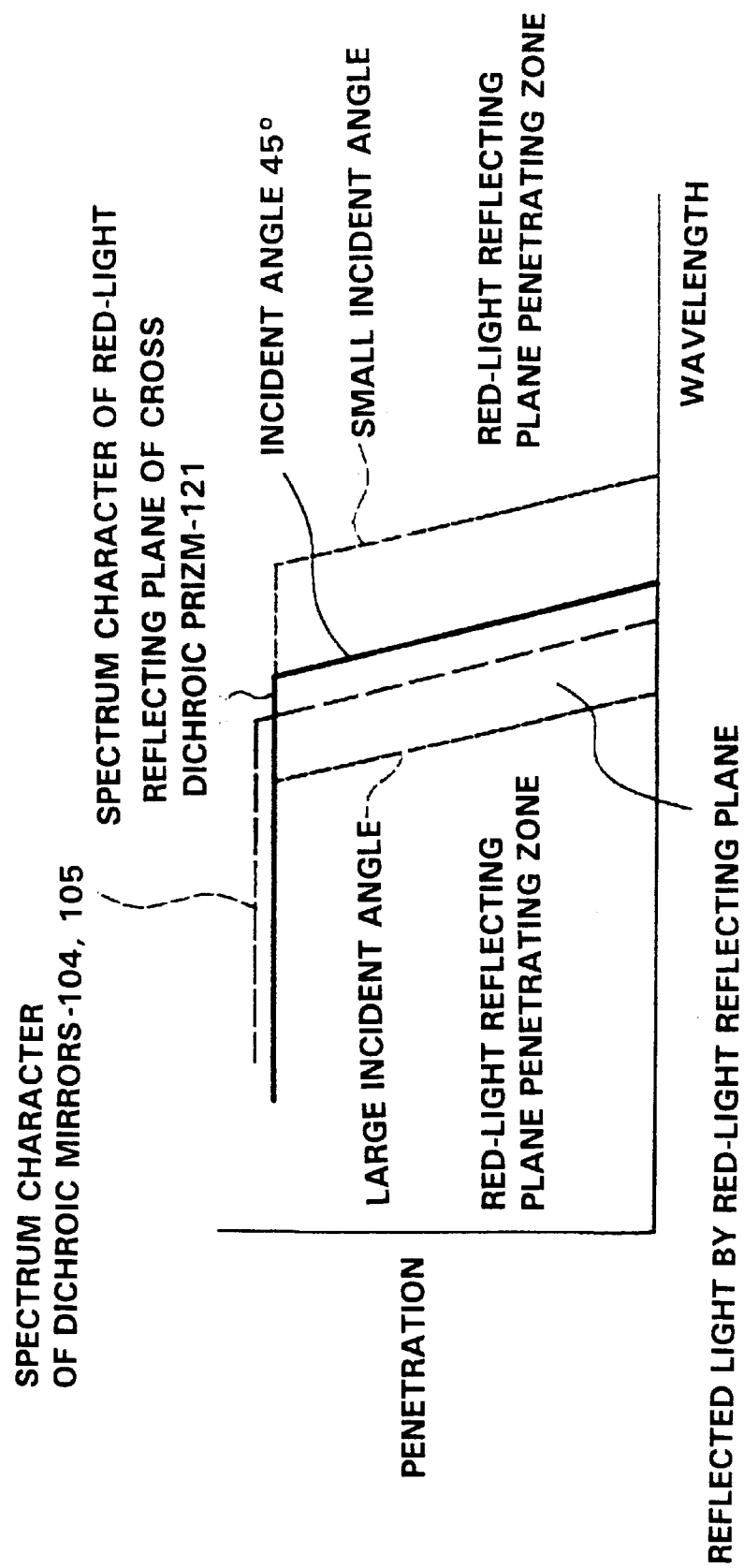
FIG. 5 is an explanatory diagram showing the incident angle dependency of the cross dichroic prism according to the related art.

Moreover the first quarter-wave-length plate 24 is disposed so that the lag-phase axis direction thereof is inclined 45 degrees with respect to the polarizing direction of the outgoing light from the blue-light modulating LCD panel 19 as shown in FIG. 2.

The first quarter-wave-length plate 24 and the second quarter-wave-length plate 25 are disposed so that the lag-phase axes thereof intersect at right angle as shown in FIG. 2.

Therefore the polarized light going out from the blue-light modulating LCD panel 19 is retained as it is, so that a polarizing screen is available.

As a result, the projected image becomes high contrast even in a well-lighted room.

The green-light removing element disposed between the blue-light modulating LCD panel 19 and the cross dichroic prism 21 is not limited to this embodiment. a For example, the green-light removing element is comprised of the reflection type blue-light penetration filter 23 disposed between the blue-light modulating LCD panel 19 and the cross dichroic prism 21, and the second quarter-wave-length plate 25 disposed between the cross dichroic prism 21 and the reflection type blue-light penetration filter 23. The green-light removing element may be arranged so that the lag-phase axis direction of the second quarter-wave-length plate 25 differs from the polarizing direction of outgoing light from the blue-light modulating LCD panel 19.

Moreover the green-light removing element is comprised of the reflection type blue-light penetration filter 23 disposed between the blue-light modulating LCD panel 19 and the cross dichroic prism 21, and the second quarter-wave-length plate 25 disposed between the cross dichroic prism 21 and the reflection type blue-light penetration filter 23. The green-light removing element may be arranged so that the lag-phase axis direction of the second quarter-wave-length plate 25 is inclined 45 degrees with respect to the polarizing direction of outgoing light from the blue-light modulating LCD panel 19.

Moreover the green-light removing element is comprised of the reflection type blue-light penetration filter 23 disposed between the blue-light modulating LCD panel 19 and the cross dichroic prism 21, and the first quarter-wave-length plate 24 disposed between the blue-light modulating LCD panel 19 and the reflection type blue-light penetration filter 23. The green-light removing element may be arranged so that the lag-phase axis direction of the first quarter-wave-length plate 24 differs from the polarizing direction of outgoing light from the blue-light modulating LCD panel 19.

Furthermore, the green-light removing element is comprised of the reflection type blue-light penetration filter 23 disposed between the blue-light modulating LCD panel 19 and the cross dichroic prism 21, and the first quarter-wave-length plate 24 disposed between the blue-light modulating LCD panel 19 and the reflection type blue-light penetration filter 23. The green-light removing element may be arranged so that the lag-phase axis direction of the first quarter-wave-length plate 24 is inclined 45 degrees with respect to the polarizing direction of outgoing light from the blue-light modulating LCD panel 19. The green-light removing element is arranged that the green light does not come into the back surface of the blue-light modulating LCD panel 19. Therefore the deterioration of the contrast of the blue-light modulating LCD panel 19 can be prevented.

Since the reflection type blue-light penetration filter 23 is provided as the green-light removing element, the intensity loss of the blue light is less, so that the white balance hardly changes.

The second quarter-wave-length plate 25 is disposed between the reflection type blue-light penetration filter 23 and the cross dichroic prism 21. The green light reflected by the reflection type blue-light penetration filter 23 does not return to the green-light modulating LCD panel 18. Therefore the deterioration of the contrast of the green-light modulating LCD panel 18 can be prevented.

The first quarter-wave-length plate 24 is arranged so that the lag-phase axis direction thereof is inclined 45 degrees with respect to the polarizing direction of outgoing light from the blue-light modulating LCD panel 19. Moreover the first quarter-wave-length plate 24 and the second quarter-wave-length plate 25 are arranged so that the lag-phase directions thereof intersect at right angle. Therefore the polarized light going out from the blue-light modulating LCD panel 19 is retained as it is, so that a polarizing screen is made usable.

As a result, the projected image becomes high contrast even in a well-lighted room.

What is claimed is:

1. An optical system for a liquid crystal projector, comprising:
   a light source for emitting a white light,
   an optical divider for dividing said white light into red, green and blue lights,
   a polarizer for polarizing each of said red, green and blue light,
   a liquid crystal display panel for modulating each of said polarized red, green and blue light,
   an optical synthesis element in which two color synthesis planes are arranged at right angle for synthesizing said polarized red, green and blue lights, and
   a green-light removing element for removing green light disposed between said liquid crystal display panel for said blue light and said color synthesis element.

2. The optical system as defined in claim 1, wherein said green-light removing element, comprising:
   a reflection type blue-light penetration filter disposed between said liquid crystal display panel for said blue light and said color synthesis element, and
   a quarter-wave-length plate disposed between said color synthesis element and said reflection type blue-light penetration filter, and
   the lag-phase axis direction of said quarter-wave-length plate differs from the polarizing direction of outgoing light from said liquid crystal display panel for said blue light.

3. The optical system as defined in claim 2, wherein said quarter-wave-length plate is arranged so that the lag-phase axis direction thereof is inclined 45 degrees with respect to the polarizing direction of outgoing light from said liquid crystal display panel for said blue light.

4. The optical system as defined in claim 1, wherein said green-light removing element, comprising:
   a reflection type blue-light penetration filter disposed between said liquid crystal display panel for said blue light and said color synthesis element,
   a quarter-wave-length plate disposed between said liquid crystal display panel for said blue light and said reflection type blue-light penetration filter, and
   the lag-phase axis direction of said quarter-wave-length plate differs from the polarizing direction of outgoing light from said liquid crystal display panel for said blue light.

5. The optical system as defined in claim 4, wherein said quarter-wave-length plate is arranged so that said lag-phase axis direction thereof is inclined 45 degrees with respect to the polarizing direction of outgoing light from said liquid crystal display panel for said blue light.

6. The optical system as defined in claim 1, wherein said green-light removing element, comprising:

- a reflection type blue-light penetration filter disposed between said liquid crystal display panel for said blue light and said color synthesis element,
- a first quarter-wave-length plate disposed between said color synthesis element and said reflection type blue-light penetration filter,
- a second quarter-wave-length plate disposed between said liquid crystal display panel for said blue light and said reflection type blue-light penetration filter, and
- the lag-phase axes directions of said first quarter-wave-length plate and said second quarter-wave-length plate differ from each other, and also differ from the polarizing direction of outgoing light from said liquid crystal display panel for said blue light.

7. The optical system as defined in claim 6, wherein said first quarter-wave-length plate is arranged so that the lag-phase axis direction thereof is inclined 45 degrees with respect to the polarizing direction of outgoing light from said liquid crystal display panel for said blue light, and said first quarter-wave-length plate and said second quarter-wave-length plate are arranged so that the lag-phase axes thereof intersect at right angle.

* * * * *

UNITED STATES PATENT AND TRADEMARK OFFICE
CERTIFICATE OF CORRECTION

PATENT NO. : 5,934,778
DATED : August 10, 1999
INVENTOR(S) : Shioya

It is certified that error appears in the above-identified patent and that said Letters Patent is hereby corrected as shown below:

On the Title Page, after item [22] insert, item
[30] Foreign Application Priority Data
    March 10, 1998 [JP] Japan..........10-058607

Signed and Sealed this

Fifteenth Day of February, 2000

Attest:

Q. TODD DICKINSON

*Attesting Officer*     *Commissioner of Patents and Trademarks*